United States Patent Office 2,806,893
Patented Sept. 17, 1957

2,806,893

1-ETHYLIDENE-7-ISOPROPYL-4B-METHYL-UNDECAHYDROPHENANTHRENE

Lee A. Subluskey, Wilmington, Del., assignor to Hercules Powder Company, Wilmington, Del., a corporation of Delaware No Drawing. Application May 18, 1955,
Serial No. 509,397

2 Claims. (Cl. 260—666)

This invention relates to new dienes having a phenanthrene nucleus and which are prepared from hydrogenated rosin and, more particularly, to the dienes obtained by the dehydration of the diol produced when the lactone of hydroxytetrahydroabietic acid is reduced.

It is well-known that a crystalline lactone may be obtained from partially hydrogenated rosin, i. e., a rosin containing a dihydroabietic acid, by treatment of the rosin with sulfuric acid. This lactone is commonly called the lactone of "hydroxytetrahydroabietic acid" and is characterized by a melting point of 131–132° C. and $[\alpha]_D$ —3°. It is now well-accepted that the angular methyl group in the lactone is at the 4b-position and the alcoholic oxygen at the 4a-position, the angular methyl group having shifted during lactonization from the 4a-position, which it has in dihydroabietic acid, to the 4b-position. On reduction of the lactone of hydroxytetrahydroabietic acid with an alkali metal aluminum hydride, there is produced, as disclosed in my copending application Serial No. 327,150, filed December 20, 1952, now abandoned, a diol wherein a hydroxyl radical is attached to the 4a-position and the carboxyl group in the 1-position has been reduced to a hydroxymethyl group. This diol may, therefore, be named tetradecahydro-4a-hydroxy-1-hydroxymethyl-7-isopropyl-1, 4b-dimethylphenanthrene.

Now, in accordance with this invention, it has been found that the diol obtained by the reduction of the lactone of hydroxytetrahydroabietic acid may be dehydrated to produce dienic compounds and further that during the dehydration reaction a Wagner-Meerwein rearrangement of the carbons attached to the 1-position takes place to yield dienes wherein an ethylidene group is attached to the 1-position. The position of the second double bond is not certain but is an endo double bond believed to be, for the most part, in either the 4a,10a- or 10,10a-position inasmuch as these dienes have an ultraviolet absorption spectrum typical of a compound showing conjugated double bonds. In any event the product produced by the dehydration of the diol is a mixture of 1-ethylidene - 7 - isopropyl - 4b - methyl - dodecahydrophenanthrenes, the more important of which are believed to have the following structure:

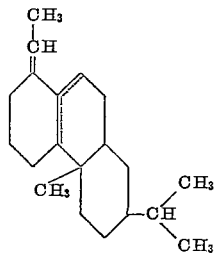

where the dotted lines indicate that the second double bond may be in either one or the other of the two indicated positions.

The following examples will illustrate the preparation of these new dienes in accordance with this invention. Parts and percentages are by weight unless otherwise specified.

EXAMPLE 1

*Preparation of the diol*

A solution of 10 parts of the lactone of hydroxytetrahydroabietic acid obtained by treatment of dihydroabietic acids with sulfuric acid and having a melting point of 131°–132° C. in 500 parts of dry benzene was added during two hours to an agitated solution of 5.6 parts of lithium aluminum hydride in 500 parts of anhydrous diethyl ether. The reaction mixture was agitated and refluxed for three days, after which it was poured onto cracked ice so as to decompose any unreacted hydride and then was stirred with 100 parts of 20% sulfuric acid for three hours. The ether—benzene solution was separated, washed, and dried. Removal of the ether and benzene yielded 9.14 parts (90% of the theoretical yield) of the white crystalline diol. When the diol is melted slowly, two melting points can be observed, one at 137.5°–138.5° C. and one at 149°–150° C. Several recrystallizations from isooctane failed to change these melting points. The carbon and hydrogen analyses of this diol were in agreement with the calculated values.

*Dehydration of the diol*

Thirty-one parts of the above diol was added to 925 parts of concentrated sulfuric acid, the temperature being held at 0° C. during the addition. Agitation of the mixture was continued for 14 hours at 0° C., after which time the temperature was allowed to rise to 25° C. during a period of 4 hours. The brown-red reaction solution was then poured slowly into 4000 parts of cracked ice. The organic matter was extracted from the aqueous mixture four times with 500 parts of diethyl ether. The combined ether extracts were then washed with 2% sodium hydroxide solution and finally with water until neutral. After drying the ether solution and evaporating it, there was obtained 27.2 parts of a brown-red, viscous oil. This oil was distilled at reduced pressure whereby there was obtained 17.5 parts of a light yellow, fluid distillate having a boiling point of 140–142° C. at 0.3 to 0.4 mm. The carbon and hydrogen analyses agreed with those calculated for the compound having the empirical formula of $C_{20}H_{32}$. The ultraviolet spectrum was typical for that of a compound containing conjugated double bonds.

A stream of ozone was bubbled slowly through a solution of 1 part of the above diene in 50 parts of ethyl chloride for 3 hours at Dry Ice-acetone temperatures. The ozonide so formed was decomposed by boiling the reaction solution for 2 hours with a mixture of 75 parts of glacial acetic acid and 1 part of zinc dust. The off gases from this decomposition, aided by a nitrogen sparge, were passed through a reflux condenser cooled to 25° C. and then into an aqueous 2,4-dinitrophenylhydrazine hydrochloride solution. The 2,4-dinitrophenylhydrazone which precipitated was collected and dried, and after two recrystallizations from isopropanol had a melting point of 137–142° C. An X-ray diffraction pattern showed that it was the 2,4-dinitrophenylhydrazone of acetaldehyde. Thus it was proved that a Meerwein-Wagner rearrangement of the carbon atoms attached to the 1-position had taken place with the formation of an ethylidene group attached to the 1-position.

An adduct of the diene and maleic anhydride was formed by refluxing 2 parts of the diene with 1.5 parts of fresh, triply distilled maleic anhydride in 50 parts of anhydrous benzene for 24 hours. The benzene was then distilled off at reduced pressure and the residue was taken up with ether. The ethereal solution was washed with water, after which the ether was removed by evaporation. The residue was then refluxed with 2 parts of sodium hydroxide and 50 parts of ethanol for 16 hours. After removing the ethanol by distillation, the residue was acidified with concentrated hydrochloric acid and then dissolved in ether. The ethereal solution was extracted three times with a 2% aqueous sodium hydroxide solution and then with water. The combined alkali and water portions were acidified with concentrated hydrochloric acid and extracted with ether. The ether extract was thoroughly washed with water, dried, and then evaporated to yield 0.92 part of the adduct of the diene and maleic anhydride. The formation of this adduct thus furnished positive proof of the presence of an endocyclic double bond.

EXAMPLE 2

Three parts of the same diol used in Example 1 was dissolved in 200 parts of dry benzene. This solution was then stirred and refluxed while 6 parts of phosphorous pentoxide was slowly added. After stirring and refluxing for 24 hours, the reaction mixture was cooled, and then washed several times with water and with a saturated solution of sodium bicarbonate. The resulting benzene solution was dried and evaporated to yield 2.80 parts of crude product. Purification of this by chromatographing through an alumina column with hexane gave 2.7 parts of diene product, $\lambda_{max.}^{alc.}$ 243 ($\alpha$=26).

EXAMPLE 3

To a mixture consisting of 300 parts of 85% phosphoric acid and 150 parts of phosphorous pentoxide, 31 parts of the same diol was added. This solution was heated on a steam bath for 18 hours. At the end of this time the reaction solution was poured into water, and the resulting mixture extracted with ether. Drying and evaporation of the ether extract yield 26.9 parts of crude product, which was distilled at reduced pressures to the diene product, $\lambda_{max.}^{alc.}$ 243.5m$\mu$ ($\alpha$=22).

As may be seen from the foregoing examples, the diol obtained by the reduction with alkali metal aluminum hydride of the lactone of hydroxytetrahydroabietic acid may be dehydrated to produce new dienes, which dienes have the phenanthrene nucleus with an ethylidene group attached to the 1-position, a methyl group attached to the 4b-position, and an isopropyl group attached to the 7-position, the second double bond being an endoethylene double bond in conjugate position to that of the ethylidene group. Since there is more than one position for the endo double bond which would be in conjugate relationship to the double bond of the ethylidene group, it must be assumed that the product obtained by the dehydration of the diol is a mixture of dienes. The product is, therefore, described as a 1-ethylidene-7-isopropyl-4b-methyldodecahydrophenanthrene.

The dehydration reaction can be carried out by treating the diol with a dehydration agent, as, for example, a strong mineral acid such as sulfuric acid, phosphoric acid, or other strong acidic material such as phosphorous pentoxide, boron trifluoride, acidic clays, etc. The temperature at which the dehydration reaction is carried out will depend upon the dehydrating agent being used, whether or not a solvent is used for the reaction, etc. In general, the reaction is carried out at a temperature of about −20° to about 50° and preferably from about 0° C. to about 25° C. As just mentioned, it may be desirable to carry out the dehydration reaction in a solvent as exemplified by the above examples where phosphorous pentoxide was used as the dehydrating agent on a solution of the diol in benzene and on a solution of the diol in phosphoric acid. Other solvents which might also be employed are toluene, halogenated benzenes, xylenes, and similar solvents.

The method of separating the dienes and purification thereof will depend, of course, upon the method used for carrying out the dehydration reaction. Illustrative methods are disclosed in the examples.

The dienes prepared in accordance with this invention may be purified by distilling under reduced pressures or by chromatographic separation using alumina as the adsorbent.

The dienes of the invention have the ability to form a hard, tough film when catalyzed with a metallic drier, e. g. cobalt naphthenate, and by virtue of this property are useful, often with improvement, in applications where fatty drying oils are conventionally employed. Thus they may be used as paint vehicles, core oils and the like.

Illustrating their use as a core oil, a composition comprising 300 parts New Jersey 70 sand, 10 parts bentonite and 12 parts of the diene product of Example 1 (catalyzed with 0.004% cobalt as cobalt naphthenate) was cast as a foundary core for a 10 inch pipe valve. The core was found to possess both good strength and good resistance to moisture.

What I claim and desire to protect by Letters Patent is:

1. A compound having the formula

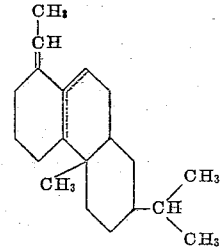

wherein a double bond is in one of the positions indicated by dotted lines.

2. The process which comprises dehydrating tetradecahydro - 4a - hydroxy - 1 - hydroxymethyl-7-isopropyl-1,4b-dimethylphenanthrene by contacting said compound with a dehydrating agent.

References Cited in the file of this patent

Brossi et al.: Chemical Abstracts, vol. 46, 1952, p. 6619; abstracted from Helv. Chim. Acta, vol. 34, pp. 2446–9, 1951.

Simonsen: "The Terpenes," vol. II. Cambridge University Press, 1949 (pages 156–158 relied on).